March 30, 1965 A. UHLIR, JR 3,176,202
SEMICONDUCTOR DEVICE
Filed Feb. 7, 1962
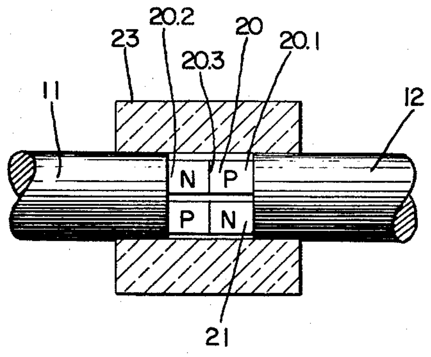
INVENTOR.
ARTHUR UHLIR JR.
BY Alfred H. Rosen
ATTORNEY

United States Patent Office 3,176,202
Patented Mar. 30, 1965

3,176,202

SEMICONDUCTOR DEVICE

Arthur Uhlir, Jr., Weston, Mass., assignor to Microwave Associates, Inc., Burlington, Mass., a corporation of Massachusetts Filed Feb. 7, 1962, Ser. No. 171,603
3 Claims. (Cl. 317—234)

This invention relates in general to semiconductor devices and more particularly to such devices in which the functions of a pair of semiconductors reversely connected in parallel between two points in a circuit are achieved in a single device. This application is a continuation in part of my application Serial No. 812,545, filed May 11, 1959, for Hermetically Sealed Semiconductor, now U.S. Patent No. 3,034,079, issued May 8, 1962.

There are numerous circuit environments in which it is advantageous to employ a pair of semiconductor diodes connected in relatively opposite directions in parallel between two points in a circuit. Among these is the function of a limiter. Heretofore when two separate diodes have been so employed, the utility of this arrangement has been seriously restricted on account of the inductance of the leads and packages of the two separate diodes, and because of the great difficulty experienced in placing two separate diodes in a small space. Since each diode requires its own socket or connections, a lower limit is placed upon the minimum distance which can be achieved between them, and inevitably a current loop is formed which includes the two circuit points and which may be resonant to some frequency at which the circuit itself is intended to operate. Further, if such a configuration is not resonant directly to an operating frequency, the resulting loop may be resonant to another frequency which can be excited in it during normal operation of the circuit, thereby introducing spurious frequency energy which, of course, is undesirable.

It is the principal object of the present invention to provide reversely connected diode pairs which do not have the foregoing limitations. A more specific object is to provide a pair of diodes relatively reversely connected in parallel between two electrodes in a single housing, which can then be connected into a circuit in the same manner as single diodes which are now available.

According to the invention in its broader aspects, there is provided a semiconductor device comprising a pair of diodes, a pair of electrical conductors, said diodes being connected in shunt in relatively opposite directions between said conductors, and a single housing enclosing both of said diodes, said conductors being separately exposed through said housing.

According to the invention in a more specific aspect, there is provided a semiconductor device comprising first and second semiconductor elements each having a region of P type material and a region of N type material, a first electrical conductor ohmically connected to the P type region of said first element and the N type region of said second element, a second electrical conductor ohmically connected to the N type region of said first element and the P type region of said second element, and a single envelope enclosing both of said elements, said conductors being separately exposed through said envelope.

Other and further objects and features of the invention will become apparent from the following description of an embodiment thereof. This description refers to the accompanying drawing, the sole figure of which illustrates a semiconductor device according to the invention.

In the drawing a first semiconductor element 20 and a second semiconductor element 21 are reversely connected between two electrical conductors 11 and 12, respectively. Each of the semiconductor elements is a PN semiconductor diode. Thus the first element 20 has a region of P type material 20.1 and a region of N type material 20.2 which meet at a junction 20.3. Each of these regions may be regarded as an electrode which is ohmically connected, respectively, to one of the two electrical conductors 11, 12, respectively. The ohmic connections may be made by any of the techniques which are now known in the art. The second semiconductor element 21 is similarly constructed and bonded to the conductors 11 and 12, respectively, except that it is connected in reverse relative to the first element 20. Thus the region of N type material of the first element 20 and the region of P type material of the second element 21 are both connected to the same end of the first conductors 11, while the region of P type material of the first element 20 and the region of N type material of the second element 21 are both connected to the same end of the second conductors 12. Accordingly, there are two semiconductor diode elements reversely connected between the two conductors 11 and 12. A housing element 23 surrounds the confronting ends of the conductors 11 and 12, and the two diode elements 20 and 21, enclosing both diode elements in a single housing. The housing element 23 is shown schematically only and it will be appreciated that any known housing technique for enclosing diodes may be used. The two diode elements 20 and 21 are individually devoid of any housing material and can therefore be located very close together in the housing 23. In fact they can be made sufficiently small so that both may be included in diode housings currently available which are intended for the housing of a single diode element. In this fashion the need for special sockets or holders is eliminated and a semiconductor device is afforded which comprises two diodes reversely connected between two conductors so that they afford a reversely connected diode in a single device and which can be installed in an existing socket in place of a single diode. The above-mentioned problems deriving from the inductance of a configuration involving two separately housed diodes and their necessary connections is drastically reduced and in many situations completely eliminated for all practical purposes.

The embodiments of the invention which have been illustrated and described herein are but a few illustrations of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in this art on a reading of the foregoing specification are also within the spirit and scope of the invention, and it is intended that this invention includes all modifications and equivalents which fall within the scope of the appended claims.

What is claimed is:

1. A rectifying diode assembly comprising:
a pair of diodes each having similar electrical characteristics and a pair of opposite poles arranged in relatively opposite directions;
a hollow insulating housing enclosing both diodes and having a pair of open ends;
a first lead, supported by the housing at one of the open ends, the end of the first lead being in direct ohmic contact with both the one pole of one diode and the opposite pole of the other diode; and
a second lead, supported by the housing at the other open end, the end of the second lead being in direct ohmic contact with both the opposite pole of the said one diode and the one pole of the said other diode.

2. A semiconductor assembly comprising:

first and second semiconductor elements each having a region of P type material and a region of N type material forming a P-N junction therebetween, the regions arranged in relatively oppositely poled directions:

a hollow insulating housing enclosing both semiconductor elements and having a pair of open ends;

a first lead, supported by the housing at one open end thereof, in direct ohmic contact with the P type region of the first semiconductor element and the N type region of the second semiconductor element; and a second lead supported by the housing at the other end thereof, in direct ohmic contact with the N type region of the first semiconductor element and the P type region of the semiconductor element.

3. A semiconductor assembly comprising:

first and second semiconductor elements each having a region of P type material and a region of N type material forming a P-N junction therebetween, the regions arranged in relatively oppositely poled directions:

a hollow insulating tubular housing enclosing both semiconductor elements and having a pair of open ends of a given inner diameter;

a first lead, having the given diameter as its outside dimension supported by the housing in one open end thereof, in direct ohmic contact with both the P type region of the first semiconductor element and the N type region of the second semiconductor element at its end inside the housing; and a second lead, having the given diameter as its outside dimension supported by the housing in the other end thereof in direct ohmic contact with both the N type region of the first semiconductor element and the P type region of the second semiconductor element at its end inside the cavity.

References Cited by the Examiner

UNITED STATES PATENTS

| | | | |
|---|---|---|---|
| 2,221,773 | 11/40 | Berman | 317—234 |
| 2,516,344 | 7/50 | Ross et al. | 317—234 |
| 2,962,394 | 11/60 | Andres | 317—240 |

FOREIGN PATENTS

| | | |
|---|---|---|
| 526,251 | 2/54 | Belgium. |

DAVID J. GALVIN, *Primary Examiner.*

GEORGE W. WESTBY, DAVID J. GALVIN, *Examiners.*